No. 624,893. Patented May 9, 1899.
L. K. DAVIS.
FILTER BED.
(Application filed Jan. 13, 1899.)
(No Model.)
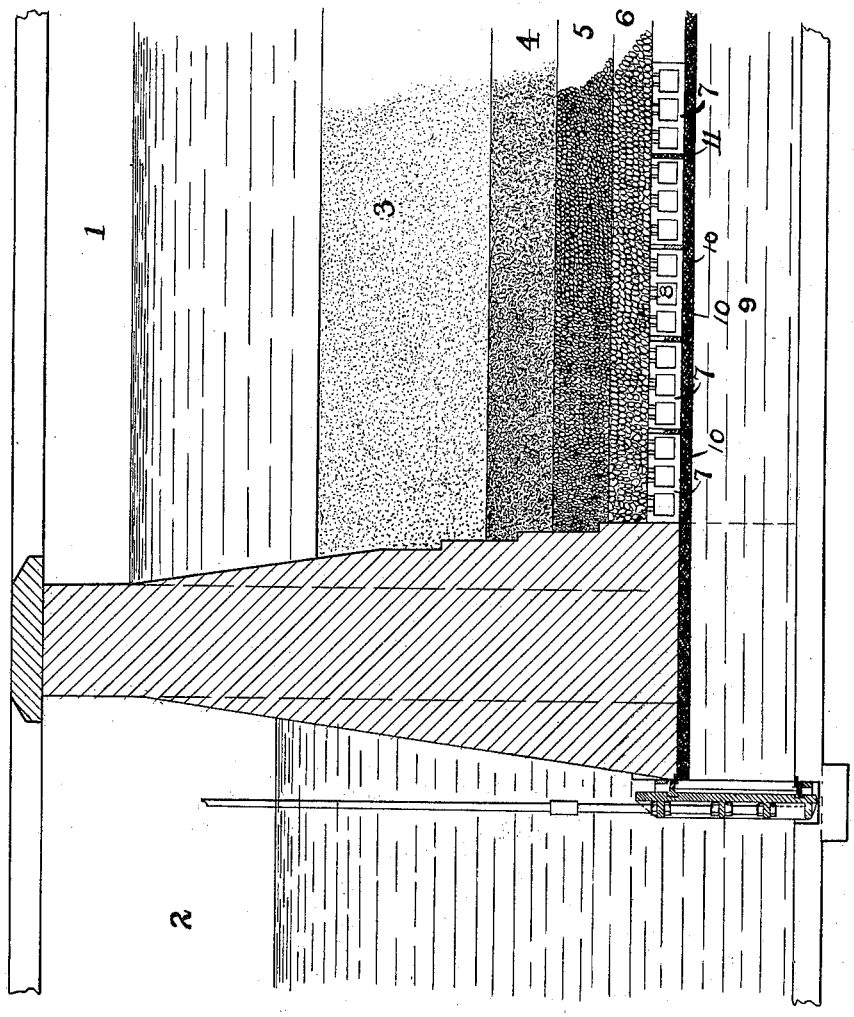
Witnesses
G. W. Hess
Olaf L. Peterson
Lewis K. Davis Inventor
By his Attorney C. W. Edwards

UNITED STATES PATENT OFFICE.

LEWIS K. DAVIS, OF NEW YORK, N. Y., ASSIGNOR, BY MESNE ASSIGNMENTS, TO THE UNITED STATES SAND FILTRATION COMPANY, OF NEW JERSEY.

FILTER-BED.

SPECIFICATION forming part of Letters Patent No. 624,893, dated May 9, 1899.

Application filed January 13, 1899. Serial No. 702,055. (No model.)

*To all whom it may concern:*

Be it known that I, LEWIS K. DAVIS, a citizen of the United States, residing at New York, in the county of New York and State of New York, have invented certain new and useful Improvements in Filter-Beds, of which the following is a full, clear, and exact specification.

My invention relates generally to filter-beds, and particularly to the tiles used in such beds to form the lowermost strata through which the liquid passes to reach the drain. As is generally known, these beds usually comprise a reservoir into which the liquid to be filtered flows and having a bottom composed of successive layers of fine sand, coarse sand, fine gravel, coarse gravel, and porous-clay hollow drain-tiles which lead into the drain-conduit at the bottom. The material of which the layers are composed is often varied, but in general the material becomes more and more coarse as the bottom is reached, the object generally being to make the progress of the liquid more and more rapid as it progresses after passing the first layer. Heretofore it has been customary to use porous-clay hollow drain-tiles as the last and supporting strata, the joint of the various tiles being made loose to facilitate the flow of the liquid into the drain-tiles. This, however, is unsatisfactory, in that the tiles impede the flow of the liquid unless made porous to a high degree or the joints of the separate tiles being very loose, and in either of these cases the necessary strength of the tiles to support the layers above the tiles is impaired.

My invention therefore comprehends the construction of a tile which shall possess great strength, be adapted for convenient and economical construction of the bed, and shall not interfere with or impede the flow of liquid into the drain.

The invention will be more particularly described hereinafter with reference to the accompanying drawings, in which—

Figure 1 is a sectional view of a filter-bed embodying my invention. Fig. 2 is a detail end view of one of the tiles, and Fig. 3 is a plan view of the tile shown in Fig. 2.

Referring more particularly to the drawings, 1 represents the reservoir in which is the liquid to be filtered, and 2 is the distributing-reservoir.

3, 4, 5, and 6 respectively represent the strata of material of which the bed is composed, in this instance comprising, respectively, fine sand, coarse sand, fine gravel, coarse gravel, &c., and 7 7 7 represent the tiles composing the lowermost strata and upon which rest the strata 3, 4, 5, and 6, the tiles leading into the drain-conduit.

The construction and materials thus far described may be of any desirable character and are of course varied to suit individual conditions.

The tiles 7 7 7 may be of porous or glazed material and be of any suitable shape, construction, or number of drain-passages. In all instances, however, I provide a plurality of openings 8 8 8, &c., in the upper wall of the tile, the openings being preferably of smaller diameter than the average diameter of the individual pieces of strata resting upon the tile. The openings may be arranged in any suitable order; but for convenience sake and also for reasons of appearance I prefer to arrange them in parallel lines and in line with the passages in the tiles, as illustrated in the drawings.

In constructing the filter-bed the tiles may be tightly joined together at their ends or may be of one continuous piece, if the area to be covered be not large—as, for instance, where the tiles are used to form a drain-pipe toward which the strata of filtering material incline. The tiles may be supported at their ends or in any other convenient manner, dependent largely upon the conditions and requirements of each individual bed.

In order to cheapen the cost of construction and at the same time add greatly to the strength of the bed, I prefer to set the tiles in a bed of liquid asphalt or concrete 10, which latter will rest upon the ground or whatever base may be provided for the base-filter. Ordinarily this will be hard concrete, stone, or other suitable material, and the asphalt is poured upon the base in liquid form to a depth of about half the depth of the tile. The tiles are then laid in the liquid asphalt, preferably leaving a small interval between the tiles, as shown in the drawings. If preferred, however, the tiles may fit tightly against each other, or the interval may be left and the asphalt filled into the top of the tiles, as indicated at 11 in the drawings.

In the operation of the device the liquid from the reservoir 1 passes through the respective strata into the tiles 7 7 7, &c., and thence into the drain-conduit 9, from whence it passes into the distributing-reservoir 2. At intervals the upper strata or part thereof is removed for cleansing purposes.

It will be noted that with the invention herein shown the tile may be of hard glazed material, if desired, which will give great strength in the construction of the bed and the flow of the liquid will not in any way be interfered with.

It is obvious that the invention above described may be modified or its various parts interchanged without departing from its scope or spirit, and I therefore desire it to be understood that I do not limit myself to the precise construction herein shown and described.

Having thus described my invention, I declare that what I claim as new, and desire to secure by Letters Patent, is—

1. In a filter-bed, the combination of a stratum of filtering material, a hollow tile adapted to support said material and receive the drainage from said filtering material, and a stratum of asphalt in which said tile is embedded, substantially as described.

2. In a filter-bed, the combination of a stratum of filtering material, a hollow tile adapted to support said material, and receive the drainage from said filtering material, and a stratum of asphalt in which said tile is partially embedded, substantially as described.

3. In a filter-bed, the combination of a stratum of filtering material, a hollow tile adapted to receive the drainage from said filtering material, a plurality of openings in said tile between the passage therein and the filtering material, and a stratum of asphalt in which said tile is embedded, substantially as described.

4. In a filter-bed, the combination of a stratum of filtering material, a hollow tile adapted to receive the drainage from said filtering material, a plurality of openings in said tile between the passage therein and the filtering material, and a stratum of asphalt in which said tile is partially embedded, substantially as described.

5. In a filter-bed, the combination of a plurality of strata of filtering material, a hollow tile adapted to support said material, a plurality of openings in said tile between the passage therein and the filtering material, and a stratum of asphalt in which said tile is embedded, substantially as described.

6. In a filter-bed, the combination of a plurality of strata of filtering material, a hollow tile adapted to support said material, a plurality of openings in said tile between the passage therein and the filtering material, and a stratum of asphalt in which said tile is partially embedded, substantially as described.

7. In a filter-bed, the combination of a stratum of filtering material and a hollow tile adapted to receive the drainage from said filtering material, said tile having an upper horizontal wall adapted to support said filtering material, and having a plurality of perforations therein, through which said drainage is adapted to pass, substantially as described.

8. In a filter-bed, the combination of a stratum of filtering material, a hollow rectangular tile adapted to receive the drainage from said filtering material, the upper wall of said tile being substantially horizontal and adapted to support said material, and a plurality of perforations in said horizontal wall, through which said perforations said drainage is adapted to pass, substantially as described.

9. In a filter-bed, the combination of a stratum of filtering material, a hollow tile adapted to receive the drainage from said filtering material, said tile having an upper horizontal wall adapted to support said filtering material, a plurality of perforations in said wall through which said drainage is adapted to pass, and a stratum of strengthening material in which said tile is embedded, substantially as described.

10. In a filter-bed, the combination of a stratum of filtering material, a hollow tile adapted to receive the drainage from said filtering material, said tile having an upper horizontal wall adapted to support said filtering material, a plurality of perforations in said wall through which said drainage is adapted to pass, and a stratum of strengthening material in which said tile is partially embedded, substantially as described.

In testimony whereof I affix my signature in presence of two witnesses.

LEWIS K. DAVIS.

Witnesses:
C. V. EDWARDS,
CHARLES S. ROGERS.